United States Patent
Fischer et al.

(10) Patent No.: US 8,991,304 B2
(45) Date of Patent: Mar. 31, 2015

(54) ESPRESSO COFFEE MACHINE WITH A BREWING UNIT

(75) Inventors: Daniel Fischer, Romanshorn (CH); Christian Brendle, Erlen (CH)

(73) Assignee: Eugster/Frismag AG, Amriswil (CH)

( * ) Notice: Subject to any disclaimer, the term of this patent is extended or adjusted under 35 U.S.C. 154(b) by 0 days.

(21) Appl. No.: 13/545,731

(22) Filed: Jul. 10, 2012

(65) Prior Publication Data

US 2013/0014649 A1   Jan. 17, 2013

(30) Foreign Application Priority Data

Jul. 11, 2011  (DE) ..................... 20 2011 103 272 U

(51) Int. Cl.
| | | |
|---|---|---|
| A47J 31/44 | (2006.01) | |
| A47J 31/36 | (2006.01) | |
| A47J 31/46 | (2006.01) | |

(52) U.S. Cl.
CPC .......... *A47J 31/3609* (2013.01); *A47J 31/4496* (2013.01); *A47J 31/46* (2013.01)
USPC ............. 99/293; 219/279; 219/283; 219/295; 219/302 R; 137/599.01

(58) Field of Classification Search
CPC ....................................... A47J 31/06
USPC ....... 99/279, 280, 283, 285, 289 R, 292, 294, 99/295, 297, 299, 302 R, 307, 284, 290, 99/293, 302 P
See application file for complete search history.

(56) References Cited

U.S. PATENT DOCUMENTS

| | | | | |
|---|---|---|---|---|
| 4,137,833 | A * | 2/1979 | Yelloz .............................. | 99/293 |
| 4,498,375 | A * | 2/1985 | Bedini ............................ | 99/303 |
| 4,565,121 | A * | 1/1986 | Ohya et al. ..................... | 99/281 |
| 4,583,449 | A * | 4/1986 | Dangel et al. .................. | 99/279 |
| 5,094,153 | A * | 3/1992 | Helbling ......................... | 99/280 |
| 5,127,318 | A * | 7/1992 | Selby, III ....................... | 99/295 |
| 5,337,652 | A * | 8/1994 | Fischer et al. .................. | 99/282 |
| 6,161,469 | A * | 12/2000 | Rolla .............................. | 99/293 |
| 6,382,083 | B2 * | 5/2002 | Schmed ...................... | 99/289 R |
| 7,219,599 | B2 * | 5/2007 | Geiger ............................ | 99/299 |
| 7,743,695 | B2 * | 6/2010 | Oehninger ..................... | 99/280 |
| 2004/0159242 | A1 * | 8/2004 | Geiger ............................ | 99/279 |
| 2006/0196362 | A1 * | 9/2006 | Mariller ......................... | 99/279 |

(Continued)

FOREIGN PATENT DOCUMENTS

| | | |
|---|---|---|
| DE | 30 35 157 A | 4/1982 |
| DE | 20 2005 002 228 U | 7/2006 |

(Continued)

*Primary Examiner* — Henry Yuen
*Assistant Examiner* — Lawrence Samuels
(74) *Attorney, Agent, or Firm* — DLA Piper LLP (US)

(57) ABSTRACT

A brewing unit (1) of an espresso coffee machine including a brewing chamber (25) and at least one spring-loaded pressure valve (16) which is flow-technically arranged between the brewing chamber (25) and a coffee beverage outlet and which opens when the brewing chamber pressure exceeds a structurally predetermined value. In order to produce by means of the coffee machine one kind of coffee beverage selected from at least two kinds of coffee beverages, an atmospheric coffee beverage bypass channel (21) flow-wisely disposed in parallel relative to the pressure valve (16) between the brewing chamber (25) and the coffee beverage outlet (23) may be locked depending on the kind of coffee beverage selected.

8 Claims, 2 Drawing Sheets

(56) References Cited

U.S. PATENT DOCUMENTS

2007/0012194 A1* 1/2007 Oehninger .................. 99/279
2010/0086654 A1* 4/2010 Douma ...................... 426/231
2010/0147158 A1* 6/2010 Muller ....................... 99/300

FOREIGN PATENT DOCUMENTS

| EP | 1 133 944 B | 9/2001 |
| EP | 1 502 530 B | 2/2005 |
| WO | WO 2011/045710 A | 4/2011 |

* cited by examiner

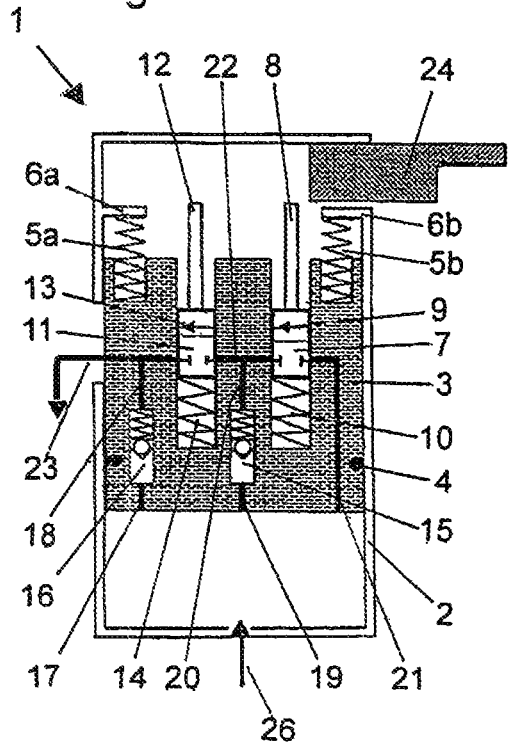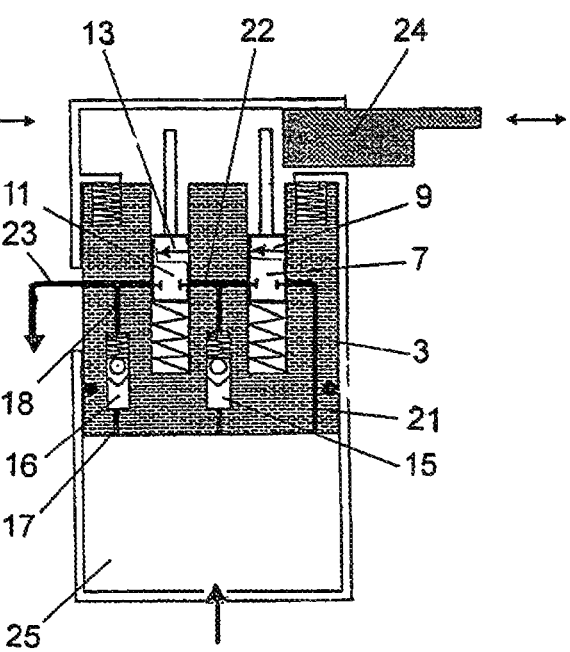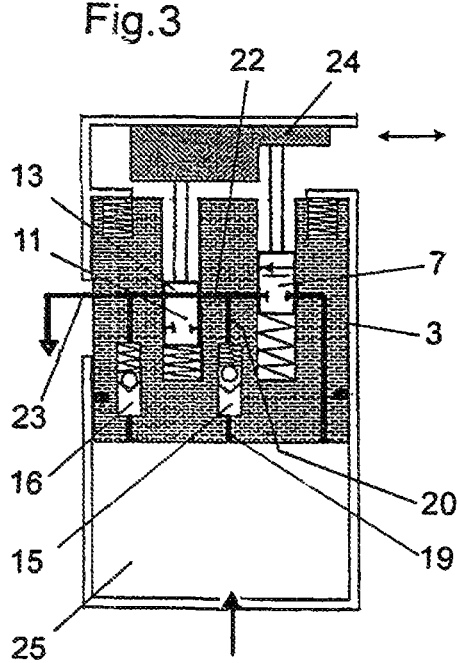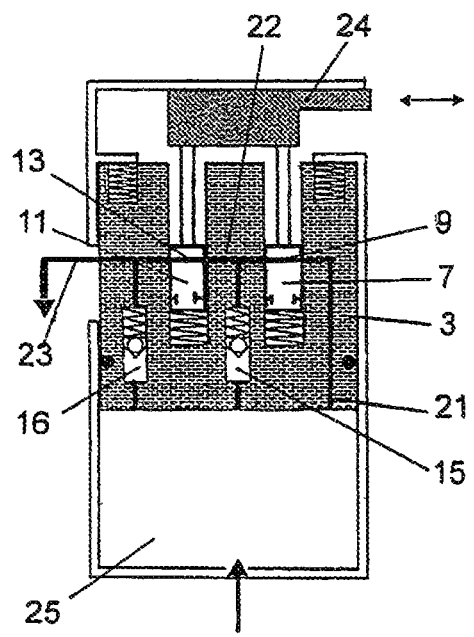

ESPRESSO COFFEE MACHINE WITH A BREWING UNIT

BACKGROUND OF THE INVENTION

1. Field of the Invention

The present invention relates to an espresso coffee machine with a brewing unit.

2. Description of the Related Art

A prior art espresso coffee machine of this kind includes a cylindrical brewing head having a sieve insert with a bottom in which an outflow opening is provided (DE 30 35 157 A1). The outflow opening forms a valve seat for a check valve, or pressure valve, including a spring carrying a valve cone engaging in the outflow opening of the sieve insert. When preparing a coffee beverage by means of such an espresso machine, the check valve is first closed by the spring whereby the pressure in the brewing head is increased as a consequence of the inflowing brewing water until the check valve opens and the coffee beverage may flow through the coffee outflow into coffee cups while on the surface of the coffee beverage, the espresso, the desired coffee foam is being formed which is referred to as the crema. The check valve is, therefore, also referred to as the crema valve.

In most case, crema valves of this sort include a spring-loaded ball or a ball end arrangement and are suited to build up in the brewing chamber a pressure of at least about 5 bar.

While an espresso-typical crema constitutes a quality feature of a good espresso, there are kinds of coffee beverages which can be prepared by the same espresso coffee machine as the espresso, where a crema is not always desired. This is particularly so in the case of a simple coffee also referred to as morning coffee which is brewed in larger portions than an espresso. A further known kind of coffee beverage referred to as "Schümli" coffee, on the other hand, ideally provides for a floating foam which is characteristic of it.

An espresso coffee machine has already been known by means of which various kinds of coffee beverages as selected by the user may be prepared and which, to this end, includes a valve device shaped as a control valve device between the brewing chamber and a beverage outlet while means are provided to be controlled by the user for varying the amount of the coffee beverage passed per time unit through the valve device (EP 1 133 944 B1). To this end, the valve device includes a spring-loaded valve body movable relative to a valve seat wherein the spring endeavors to keep the valve body in an open position and wherein the valve body is moved by the coffee beverage under pressure against the initial stressing force of the spring into the locking position. As means for varying the amount of the coffee beverage passing per time unit through the valve device, means for varying the initial stressing force of the spring might be suited, and/or the outlet cross section flow-technically relevant of a valve chamber of the valve device may be variable. Such means for varying the amount of coffee beverage passing per time unit through a control valve device, however, have to be manufactured rather precisely particularly if the outlet cross section of the control valve device should be varied. A long-term and constant effect is questionable considering that the flow rate of the brewing water flowing through the coffee powder cannot be kept by the control device on an absolutely constant value because the control behavior of the valve device, inter alia, depends on the viscosity of the passing liquid (column 3, line 56 through column 4, line 9). It is also of disadvantage that the control valve device between the brewing unit and the beverage outlet requires a sufficient installation volume within the espresso coffee machine.

BRIEF SUMMARY OF THE INVENTION

It is, therefore, an object of the present invention to provide an espresso coffee machine of the kind referred to in the beginning, wherein by uncomplicated means, simply to be produced and also reliably functioning in the long run, one kind coffee beverage selected from a plurality of kinds of coffee beverages, at least from two, may be produced with foam matching therewith. When referring to kinds of coffee beverages, to start with, espresso and simple coffee or morning coffee are considered.

The solution according to the invention based on an espresso coffee machine having a conventional spring-loaded pressure valve, or crema valve, which opens when the brewing chamber pressure exceeds a first design-determined value, in principle provides for a practically atmospheric coffee beverage bypass channel which is flow-wisely disposed in parallel to at least the first pressure valve and which, depending on the kind of coffee beverage selected, may be blocked between the brewing chamber and a coffee beverage outlet. Such closing-off may either be provided at the coffee beverage outlet side end of the coffee beverage bypass channel in an espresso coffee machine according to the present invention, or in the corresponding brewing unit according to the present invention, or may be made at a coffee beverage inlet side end of the coffee beverage bypass channel in the espresso coffee machine, or the structural unit, according to the present invention.

By the term atmospheric coffee beverage bypass channel, a coffee beverage bypass channel is to be understood, the interior pressure of which is substantially equal to the pressure of the atmosphere surrounding the coffee beverage bypass channel at its outlet-side end.

In order to optionally select either an espresso with crema or a morning coffee without floating foam, the espresso machine according to the present invention starts, in a particularly compact way, from a prior art brewing chamber provided in a brewing unit, wherein a brewing plunger is provided movable against a spring force. In this case, it is not only the first pressure valve, or crema valve, which is arranged in the brewing plunger, there are rather disposed in it the beverage bypass channel and a valve plunger of a plunger valve which can be adjusted from outside of the brewing chamber. The plunger valve with the first valve plunger which is flow-wisely connected to the coffee beverage bypass channel, on one side, and to the coffee beverage outlet, or the coffee beverage outlet channel, on the other, so that in a first valve position it blocks the coffee beverage bypass channel from the coffee beverage outlet and in a second valve position connects it to the coffee beverage outlet, thus constitutes a check valve for the functioning of which it is their two end positions only which are essential. The flow-wise connections of the first pressure valve to the coffee beverage outlet and/or the brewing chamber, contrary thereto, need not be altered or adjusted since the first pressure valve or crema valve easily opens like a safety valve only if and when the brewing chamber pressure reaches a first value determined by the design, or is about to exceed it, while this value cannot be reached when the coffee beverage bypass channel is opened.

The above-described coffee espresso machine may particularly advantageously be expanded to constitute a machine by which not only espresso and morning coffee but also "Schümli" coffee with floating foam, which is not crema, may be prepared if the user wants it.

To this end, the espresso machine includes the features that in the brewing plunger, a second spring-loaded pressure valve is flow-wisely arranged, in the coffee beverage channel arrangement between the brewing chamber and the coffee beverage outlet, which opens when the brewing chamber pressure exceeds a second value determined by the design which is lower than the first determined value of the first pressure valve, that in the brewing plunger a second movable valve plunger is adjustable from outside of the brewing chamber depending on the kind of coffee beverage to be prepared, and that the second valve plunger is shaped and flow-wisely connected with the second pressure valve, on one side, and with the coffee beverage outlet, on the other, so that in a first valve position it separates the second pressure valve from the coffee beverage outlet and in a second valve position connects it with the coffee beverage outlet.

In this espresso coffee machine, the first pressure valves, as in the espresso coffee machines according to the present invention referred to further above, serves for espresso generation with crema under a relatively high overpressure of at least about 5 bar and, optionally, the second spring-loaded pressure valve serves for Schümli coffee preparation under a pressure lower compared thereto. The first spring-loaded pressure valve may, therefore, also be considered as a high-pressure valve and the second spring-loaded pressure valve as a low-pressure valve. The second movable valve plunger of a plunger valve arranged in the brewing plunger, which may be adjusted from outside of the brewing chamber activates in its second valve position the second pressure valve for Schümli coffee preparation. Contrary thereto, the second spring-loaded pressure valve, if in the first valve position of the second valve plunger, is ineffective since it is blocked from the coffee beverage outlet. In the latter case, it is only the first spring-loaded pressure valve which is effective for espresso generation with crema formation. If, however, the coffee beverage bypass channel is connected with the coffee beverage outlet, then both the first spring-loaded pressure valve and the second spring-loaded pressure valve for the coffee beverage preparation are ineffective because the overpressure in the brewing chamber required for opening it is not reached.

For this purpose, the coffee beverage bypass channel of the embodiment of the espresso coffee machine according the present invention may advantageously be connected through to the coffee beverage outlet.

Furthermore, according to the present invention, the espresso coffee machine includes the features that the coffee beverage bypass channel in the brewing plunger is connected, via a valve plunger channel in the first valve plunger in the second valve position, via a connecting channel and via a valve plunger channel in the second valve plunger in its second valve position, with the coffee beverage outlet channel to which an outlet of the first pressure valve is connected as well; that an outlet of the second pressure valve is connected with the connecting channel; that mechanisms of the first valve plunger and of the second valve plunger are shaped so that the first valve position of the first valve plunger can be combined with either the first or the second valve position of the second valve plunger and the second valve position of the first valve plunger is coupled with the second valve position of the second valve plunger. In this arrangement, the connecting channel may, at least in sections, either pass Schümli coffee from the second spring-loaded pressure valve to the coffee beverage outlet channel because the second valve plunger is permeable, or connect the coffee beverage bypass channel to the coffee beverage outlet channel because the second valve plunger is permeable as well.

In the latter embodiment of the espresso coffee machine, or its brewing unit, the connecting channel and at least adjacent sections of the coffee beverage bypass channel and of the coffee beverage outlet channel may, in an easy-to-manufacture manner, be provided in an aligned way in the brewing plunger so that one single bore only is required for them into which cross bores as outlet channels of the first pressure valve and of the second pressure valve and one section of the coffee beverage bypass channel might discharge.

According to the present invention, the valve plunger, or the valve plungers, in the brewing plunger is, or are, adjustable via a valve plunger rod and a preset coulisse movable on one front side of the valve plunger rod, or the front sides of the valve plunger rods. In this way, the two valve plunger rods may, depending on the design of the preset coulisse in the movable range vis-à-vis the front sides of the valve plunger rods, adjust the latter in positions either different relative to each other or in a position identical relative to each other.

According to the present invention, the valve plunger, or the valve plungers, may manually be adjusted in a simple but reliable manner via the preset coulisse.

According to the present invention, on the other hand, the valve plunger, or the valve plungers, may individually be adjusted by an electromagnet each. To this purpose, the adjustments may be preprogrammed.

A further possibility of adjusting the valve plunger, or the valve plungers, according to the present invention provides for a programmably controlled electromotor with a gear coupled to the valve plunger, or valve plungers.

In a further embodiment of the espresso coffee machine according to the present invention, the coffee beverage bypass channel and the first pressure valve are arranged outside of the brewing chamber while between a coffee beverage inlet from the brewing chamber and the coffee beverage bypass channel and the first pressure valve a two-way valve is arranged by which the coffee beverage bypass channel when in a first position is locked relative to the coffee beverage inlet so that a coffee beverage may flow out only via the pressure valve activated by a pressure in the brewing chamber opening it, via a coffee beverage outlet. In contrast thereto, the first pressure valve if in a second position of the two-way valve is blocked relative to the coffee beverage inlet, but the coffee beverage bypass channel may pass, without any overpressure, the coffee beverage from the coffee beverage inlet into the coffee beverage outlet. In the first above case, coffee with crema formation may be taken from the coffee beverage outlet, in the second case it is simple morning coffee without foam.

The coffee beverage bypass channel, the first pressure valve and the two-way valve may be combined by easy final assembly to constitute a structural unit in a housing.

According to the present invention, the two-way valve may comprise in a constructively simple way a movable valve sleeve having on the side of the coffee beverage inlet a valve sleeve inlet, and on the side of the beverage bypass channel and of the first pressure valve a valve sleeve outlet, wherein the valve sleeve inlet extends along the moving path of the valve sleeve and where the valve sleeve outlet extends only along a section of the moving path in the first valve sleeve position over a pressure valve inlet or in the second valve sleeve position over a bypass channel inlet.

According to the present invention, the two-way valve may particularly suitably be designed as a solenoid valve to adjust the valve sleeve.

In both embodiments of the espresso coffee machine, the first pressure valve and, when required, the second pressure valve may designed as a spring-loaded ball valve.

In the preferred first embodiment, a particularly compact brewing unit of the espresso coffee machine comprises the features according to the present invention described above.

BRIEF DESCRIPTION OF THE SEVERAL VIEWS OF THE DRAWINGS

In the following, the invention will be described based on a drawing including five figures from which further details can be taken.

FIG. 1 shows a preferred embodiment of a brewing unit which permits the preparation of an espresso with crema formation or a Schümli coffee with floating foam or of a foam and crema free coffee, in a sectional view in a pressureless initial position, FIG. 2 shows the brewing unit according to FIG. 1 in a position for preparing an espresso with crema formation, FIG. 3 shows the brewing unit according to FIG. 1 in a position for preparing a Schümli coffee with floating foam, FIG. 4 shows the brewing unit according FIG. 1 in a position for preparing a foam and cream-free coffee or morning coffee.

DETAILED DESCRIPTION OF THE INVENTION

Figure 5:
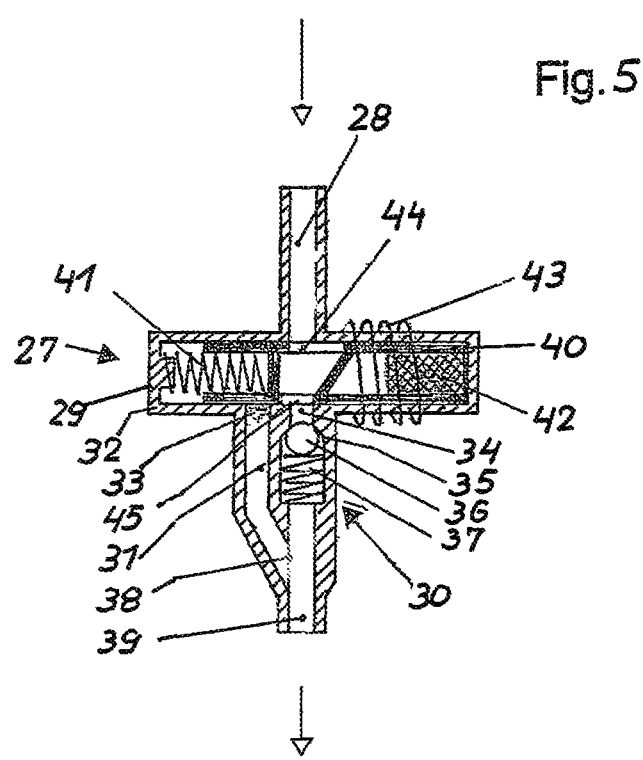
FIG. 5 shows as the second embodiment a structural unit of a valve device, in a sectional view, that can be connected with a valve-less brewing unit, not shown, in a position for preparing an espresso with crema formation.

The brewing unit 1 of FIGS. 1 through 4 comprises in a brewing chamber housing 2, a brewing chamber 25 having a brewing plunger 3 movable within it. Movement of the brewing plunger 3 may be caused by compressing the brewing unit after the uptake of the coffee powder and by the effect of the brewing water pressure in the brewing chamber 2 contrary to the pressure force of return springs 5a and 5b supported on a return spring base 6a or 6b of the brewing chamber housing 2, as can best be taken from FIG. 1 for the pressureless initial position.

In the brewing plunger 3, a first valve plunger 7 and a second valve plunger 11 are movably arranged which are kept in their initial position by means of a return spring 10, 14 each; compare FIGS. 1 and 2. The valve plungers 7, 11 may be shifted depending on the position of a preset coulisse by means of a valve plunger rod 8 or 12 each against the force of springs 14, 15. The preset coulisse 24 may be set in position either by hand or preprogrammed electromagnetically or by electromotor with a gear, that is, shifted in the direction of the double arrow not designated.

In the valve plungers 7, 11, valve plunger channels or flow channels 9, 13 are provided which depending on the position of the valve plungers 7, 11 clear the way for a passage for the channels connected with the valve plungers, or connect one inlet each of the plunger valve provided with valve plungers 7 or 11 with its outlet. In particular, to one inlet to the first valve plunger 7 a coffee beverage bypass channel 21 is connected which can be switched without overpressure when it is connected via the valve plungers 7 and 11 to a coffee beverage outlet channel 23 which leads to the outer atmosphere. A connecting channel 22 connects an outlet from the first valve plunger 7 with an inlet to the second valve plunger 11 the outlet of which is connected with the coffee beverage outlet channel 23. As can be taken from FIGS. 1 through 4, the connecting channel 22 and adjacent sections of the coffee beverage bypass channel 21 and of the coffee beverage outlet channel 23 in the brewing plunger 3 are disposed in alignment.

In the brewing plunger 3, furthermore, the spring-loaded pressure valves 15, 16 designed as ball valves of the kind of overpressure valves are associated to the brewing chamber 25. To this end, one inlet channel 17 or 19 each connects the brewing chamber 25 with the pressure valves 16 or the pressure valve 15. An outlet channel 18 connects an outlet of the pressure valve 16 with the coffee beverage outlet channel 23. An outlet channel 20, on the other hand, connects pressure valve 15 with the connecting channel 22.

The spring not designated of the pressure valve 16 opens the latter at a relatively high hydraulic pressure in the brewing chamber 25 corresponding to a crema valve. Pressure valve 16 is referred to in the present application as a first pressure valve. The first pressure valve 16 opens at such a high pressure in the brewing chamber 25 that during the flowing out of the espresso prepared in the brewing chamber 25 crema is being formed as will be shown further down in connection with FIG. 3. A spring in the pressure valve 15, on the other hand, opens already at a lower pressure in the brewing chamber 25 for preparing Schümli coffee with floating foam.

In FIG. 1, to start with, the brewing unit 1 with the brewing chamber 25 in the initial position of the brewing plunger 3 and of the preset coulisse 24 is shown while there is no overpressure in the brewing chamber 25. The preset coulisse takes a position at which the first pressure valve 16 and the second pressure valve 15 are not activated, i.e. are closed. The inlet channels 17 and 18 of the pressure valves 16 and 15 are not connected with the liquid outlet channel 23 or to the connecting channel 22.

In FIG. 2, the brewing unit is shown with a brewing chamber 25 under brewing pressure. Accordingly, the brewing plunger 3 is pressed upwardly contrary to the force of the return springs 5a, 5b, which, however, does not move the valve plungers 7, 11 because the valve plunger rods 8 and 9 are not lowered by the preset coulisse 24 into their initial position.

When the brewing pressure in the brewing chamber 25 has risen high enough, initially the second pressure valve 15 opens by which, however, no coffee beverage will get into the coffee beverage outlet channel 23 because the pressure valve 15 is blocked by the valve plunger 11 relative to the coffee beverage outlet channel 23. Subsequently with the pressure further rising in the brewing chamber 25, the first pressure valve 16 opens so that the prepared espresso flows into the coffee beverage outlet channel 23 from which the espresso flows out while generating crema.

In the situation according to FIG. 3, there is an overpressure in the brewing chamber 25 which is at least as high as the pressure at which the second pressure valve 15 opens. By shifting the preset coulisse 24, it is so positioned that the valve plunger 7 is now as before in its initial position, the valve plunger 11, however, is moved down in the open active position, so that the connecting channel 22 is connected through, via the valve plunger channel 13, to the coffee beverage outlet channel 23. Consequently, the coffee beverage prepared in the brewing chamber 25 can flow off through the pressure valve 15 which opens already at a relatively low brewing water pressure via its outlet channel 20 and the connecting channel 22 into the coffee beverage outlet channel 23 while the second pressure valve 16 which is a relative high pressure valve opens. A Schümli coffee preparation with floating foam results.

In the situation illustrated in FIG. 4, the brewing chamber 25 of the brewing unit is under sufficient brewing water pressure for preparing a coffee beverage, namely a morning coffee. To this end, the preset coulisse 24 is so moved or positioned that both valve plungers 7, 11 are in an active lowered position, i.e. they are through-connected with their valve plunger channels 9 and 13. Consequently, the brewing chamber 25 is in connection, via the coffee beverage bypass channel 21, the valve plunger channel 9, the connecting channel 22 and the valve plunger channel 13 with the coffee beverage outlet channel 23 so that the pressure in the brewing chamber is low. The morning coffee prepared in the brewing chamber may flow out practically pressureless through the channels referred to. The two pressure valves 15, 16 remain closed because a pressure that would open them will not be reached in the brewing chamber. The result is the preparation of a morning coffee without crema and without foam.

The second embodiment of the invention according to FIG. 5 constitutes a structural unit 27 arranged outside of a brewing unit, not shown, which may be designed in any known manner in substantially any shape.

The compact structural unit comprises a coffee beverage inlet 28 from which a coffee beverage prepared in the brewing unit may flow into the structural unit 27, a two-way valve 29 connected to the coffee beverage inlet 28, a pressure valve 30, and a coffee beverage bypass channel 31. These components of the structural unit are encompassed by a housing 32 correspondingly shaped.

In the housing 32, there is arranged, at an outlet, not shown, of the two-way valve 29, a bypass inlet 33 of the coffee beverage bypass channel 31, and at a second outlet of the two-way valve 29 a pressure valve inlet 34. The pressure valve 30 is formed in the kind of a crema valve with a valve seat 35 against which a valve ball 36 is pressed by a valve spring 37 so that the pressure valve 30 will open a flow pass in the pressure valve 30 only when a predetermined pressure at the pressure valve inlet 34 is exceeded. As shown in FIG. 5, a bypass outlet 38 opens into a coffee beverage outlet 39, flow-technically successively to the pressure valve 30 which also discharges into the coffee beverage outlet 39.

The two-way valve 29 disposed at right angles relative to the coffee beverage inlet 28 and the coffee beverage outlet 39 comprises a valve sleeve 40 movable within it which is pressed by the force of a valve sleeve spring 41 into the right end position shown in FIG. 5. The valve sleeve includes an iron core 42 which together with an operating winding 43 and the parts described above of the two-way valve 29, constitutes a solenoid valve.

The valve sleeve 40 shows an upper valve sleeve inlet 44 and a smaller valve sleeve outlet 45 which depending on the end position of the valve sleeve communicates with the pressure valve inlet 34 or with the bypass inlet 33. As can be taken from FIG. 5, the valve sleeve inlet 44 extends as far beyond the moving path, or in the longitudinal direction, of the two-way valve 29 that the valve sleeve outlet 45 communicates in any two-way valve position. The valve sleeve outlet 45, therefore, connects the coffee beverage inlet 28 depending on the position of the two-way valve 29 either to the pressure valve 30 or to the coffee beverage bypass channel 31.

In the rest position of the two-way valve 29 shown in FIG. 5, the coffee beverage inlet and thereby the interior of the brewing chamber is connected to the pressure valve 30 so that the coffee beverage generated in the brewing chamber flows out of the coffee beverage outlet 39 as an espresso with crema formation. When energizing the operating winding 43, on the other hand, the two-way valve is switched over into its other end position so that the interior of the brewing chamber is in connection with the coffee beverage bypass channel 31 and due to the low pressure in the brewing chamber, a simple coffee, a so-called morning coffee without any foam or crema is prepared.

The invention claimed is:

1. An espresso coffee machine, in which one kind of coffee beverage selected from at least two kinds of coffee beverages may be produced, with a brewing unit comprising a brewing chamber and a first spring-loaded pressure valve which blocks a fluid connection between the brewing chamber and a coffee beverage outlet and which opens when a brewing chamber pressure exceeds a first predetermined value, wherein
   an atmospheric coffee beverage bypass channel is in fluid connection in parallel to the first pressure valve and may be locked depending on a kind of coffee beverage selected between the brewing chamber and the coffee beverage outlet,
   a brewing plunger is movably arranged in the brewing chamber,
   the coffee beverage bypass channel and the first pressure valve are arranged in the brewing plunger,
   a first valve plunger movable in the brewing plunger may be adjusted from outside of the brewing chamber depending on the kind of coffee beverage selected,
   the first valve plunger is in fluid connection with the coffee beverage bypass channel and with the coffee beverage outlet such that, in a first valve position, it blocks the coffee beverage bypass channel from the beverage outlet and, in a second valve position, it connects the coffee beverage bypass channel with the coffee beverage outlet,
   a second spring-loaded pressure valve in the brewing plunger that is in fluid connection with the brewing chamber and with the coffee beverage outlet opens when the brewing chamber pressure exceeds a second predetermined value that is lower than the first predetermined value,
   a second valve plunger movable in the brewing plunger may be adjusted from outside of the brewing chamber depending on the kind of coffee beverage, and
   the second valve plunger is in fluid connection with the second pressure valve and with the coffee beverage outlet such that, in a first valve position, it blocks the second pressure valve from connecting to the coffee beverage outlet and, in a second valve position, it connects the second pressure valve to the coffee beverage outlet.

2. The espresso coffee machine according to claim 1, wherein
   the coffee beverage bypass channel is connected via a first valve plunger channel in the first valve plunger in its second valve position, via a connecting channel and via a second valve plunger channel in the second valve plunger in its second valve position with the coffee beverage outlet channel with which also an outlet of the first pressure valve is connected, and
   adjusting means of the first valve plunger and of the second valve plunger are so designed that the first valve position of the first valve plunger can be combined with the first or the second valve position of the second valve plunger and that the second valve position of the first valve plunger (7) and the second valve position of the second valve plunger (11) can be matched.

3. The espresso coffee machine according to claim 2, wherein the connecting channel and at least sections of the coffee beverage bypass channel and of the coffee beverage outlet adjacent to it are aligned in the brewing plunger.

4. The espresso coffee machine according to claim 1, wherein the first and second valve plungers are adjustable via a valve plunger rod and at a preset coulisse movable at one front side of the valve plunger rod.

5. The espresso coffee machine according to claim 4, wherein the first and second valve plungers are manually adjustable via the preset coulisse.

6. The espresso coffee machine according to claim 1, wherein the first and second valve plungers are individually adjustable by an electromagnet.

7. The espresso coffee machine according to claim 1, wherein the first and second valve plungers are adjustable by an electromotor and a gear.

8. A brewing unit of an espresso coffee machine having the features according to any one of claims 2 through 7.

* * * * *